United States Patent [19]

Poulsen

[11] 4,324,982
[45] Apr. 13, 1982

[54] PIPE WALL THICKNESS MONITORING APPARATUS

[75] Inventor: Peder U. Poulsen, Fredensborg, Denmark

[73] Assignee: Owens-Corning Fiberglas Corporation, Toledo, Ohio

[21] Appl. No.: 63,296

[22] Filed: Aug. 2, 1979

Related U.S. Application Data

[63] Continuation-in-part of Ser. No. 861,783, Dec. 19, 1977, abandoned.

[51] Int. Cl.³ ............................................. G01N 21/86
[52] U.S. Cl. .................................. 250/560; 356/387
[58] Field of Search ........... 250/560, 561, 209, 223 R, 250/223 B; 356/384–387

[56] References Cited

U.S. PATENT DOCUMENTS 3,529,169  9/1970  Heaney et al. ................... 250/223 B
3,724,958  4/1973  Callan ................................ 250/560
4,129,384  12/1978  Walker et al. ...................... 356/387

Primary Examiner—David C. Nelms
Attorney, Agent, or Firm—Ronald C. Hudgens; Kenneth H. Wetmore; Paul J. Rose

[57] ABSTRACT

Two boxes are mounted in vertical alignment adjacent a cylindrical mandrel surface, one above the mandrel axis and one below. The lower box contains a light source with a rectilinear filament parallel to the mandrel axis. The upper box contains an array of photosensors equidistantly spaced in a horizontal plane in a direction toward and away from the mandrel axis. Each of the photosensors is part of a separate electronic circuit with transistors, resistors, and a light emitting diode. The light emitting diodes are arranged in a display to form a column that lights up from the bottom in accordance with the thickness of a pipe wall being formed and the position of the edge of its shadow on the array of photosensors. In an alternative embodiment, a white scale is disposed in the upper box at an angle from the direction of the light source and the position of the edge of the shadow of the pipe wall on the scale gives a visual indication of thickness of the pipe wall.

7 Claims, 5 Drawing Figures

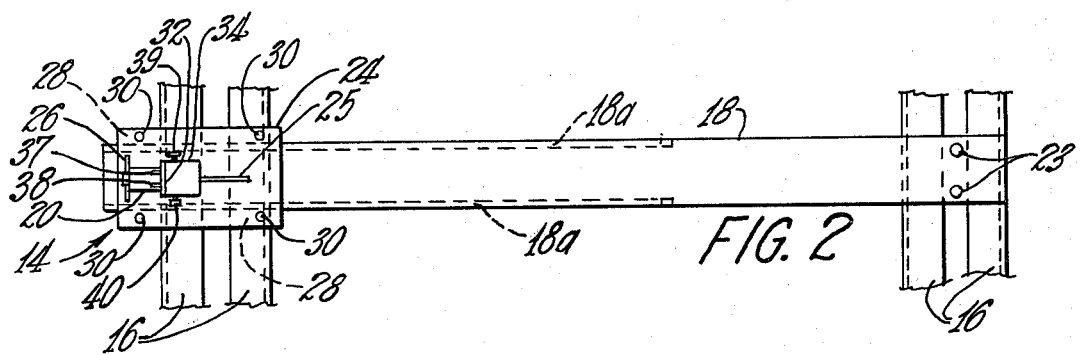
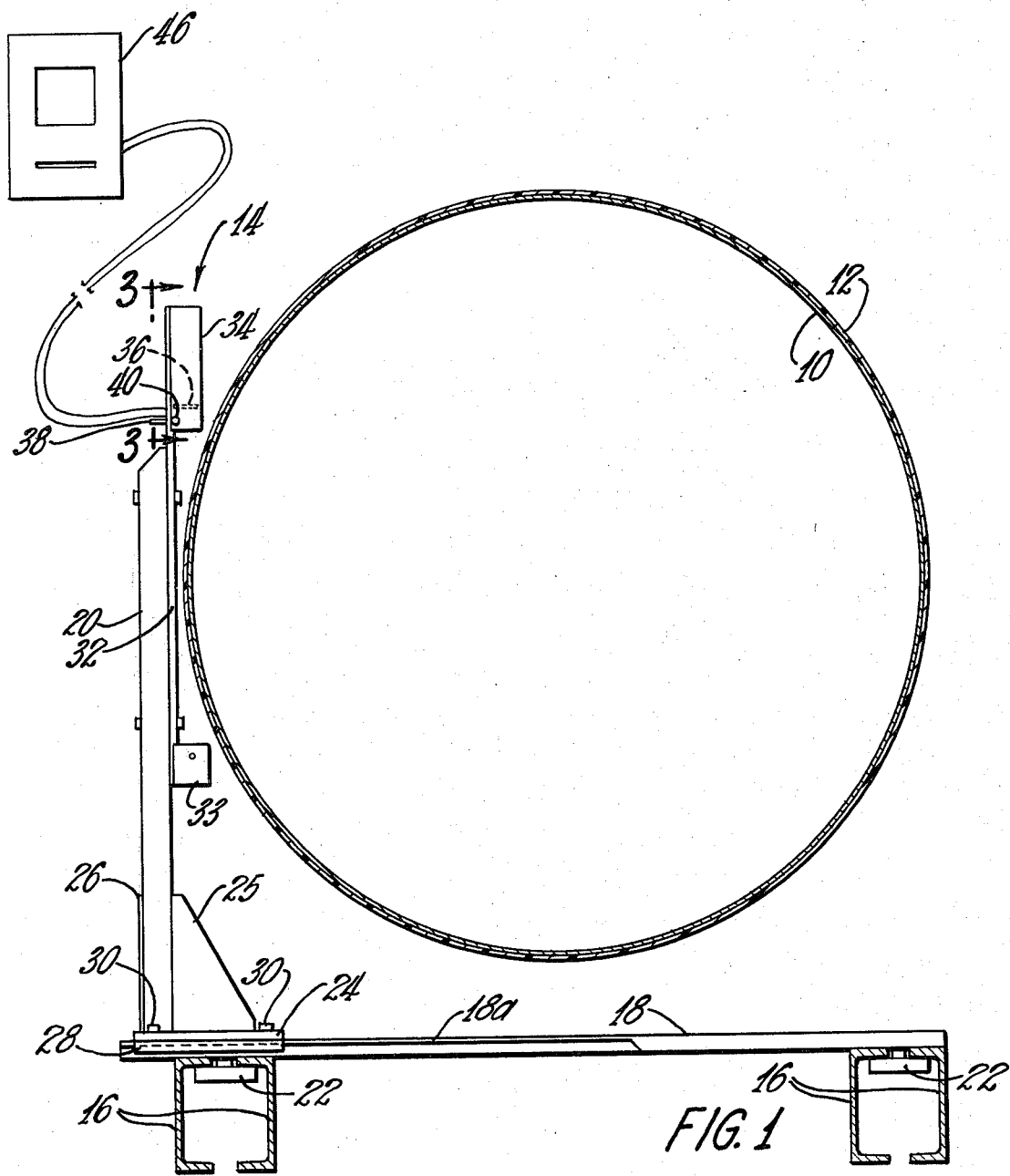

PIPE WALL THICKNESS MONITORING APPARATUS

RELATED APPLICATION

This is a continuation-in-part of application Ser. No. 861,783, filed on Dec. 19, 1977, now abandoned.

TECHNICAL FIELD

This invention relates generally to manufacture of reinforced plastic pipe, and more particularly to apparatus for monitoring thickness of pipe wall as the pipe is being made.

DISCLOSURE OF INVENTION

An object of the invention is to provide improved apparatus for monitoring thickness of pipe wall as the pipe is being made.

BRIEF DESCRIPTION OF DRAWINGS

Other objects will become apparent when the following specification is considered along with the accompanying drawings in which:

FIG. 1 is an elevational view of the pipe wall thickness monitoring apparatus of the invention shown in association with an outer wall of a mandrel and a pipe formed threon, the mandrel wall and pipe being shown in cross section;

FIG. 2 is a plan view of the monitoring apparatus

BEST MODE OF CARRYING OUT INVENTION

Figure 4:
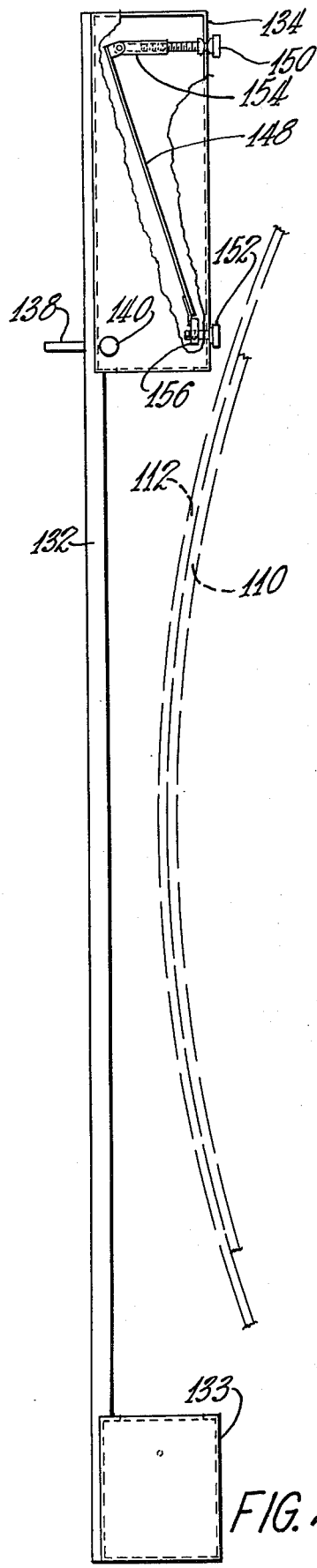
FIG. 4 is an enlarged elevational view similar to a left-hand portion of FIG. 1, but showing an alternative embodiment of the invention.

With respect to the drawings, FIG. 1 shows a cross section of an outer wall 10 of a rotatable mandrel and a pipe 12 formed thereon. The mandrel is preferably of the type shown in U.S. Pat. No. 3,679,521 issued July 25, 1972, the outer wall 10 being a continuously recirculating endless helical band and the pipe 12 being formed by application of hardenable liquid resin, sand, and glass fiber reinforcement thereto over a thin plastic parting film, as understood in the art.

A pipe wall thickness monitoring apparatus 14 constructed in accordance with the invention is mounted on supporting framework 16 of the pipe making machine having the rotatable outer mandrel wall 10. Preferably, the apparatus 14 is located just downstream of the point where the last material is applied in the forming of the pipe 12. The apparatus 14 includes a horizontal support bar 18 and a rigid column 20 extending upwardly therefrom, adjacent an end thereof as shown. The bar 18 is secured in position adjacent opposite ends by a pair of clamping plates 22 tightened by screws 23 (FIG. 2). The column 20 is welded to a horizontal mounting plate 24 and braced by a pair of plates 25 and 26. The bar 18 is recessed on the bottom adjacent opposite sides, from the left-hand end thereof as viewed in FIG. 1, for over half its length, to provide a pair of thinner edge portions 18a for clamping the mounting plate 24 in an adjusted position along the bar 18 for a purpose set forth hereinafter. The edge portions 18a are clamped respectively by a pair of clamping plates 28 each tightened by a pair of screws 30. An aluminum bar 32 secured to the column 20 adjacent an upper end portion thereof has a lower box 33 secured to a lower end portion thereof and an upper box 34 secured to an upper end portion thereof.

The lower box 33 contains a light source with a rectilinear filament parallel to the axis of the mandrel wall 10. The upper box 34 contains an array 36 of photosensors disposed in a horizontal plane generally perpendicular to the direction of light from the source in the lower box 33. As designed, the array 36 contains twenty-six photosensors spaced two millimeters apart from each other in the horizontal plane transversely of the mandrel. In addition, the box 34 contains two adjustably positioned photosensors (not shown) respectively mounted on slides adjustable by a pair of rods 37 and 38 protruding through the front of the bar 32 and securable in adjusted positions respectively by a pair of set screws 39 and 40. The photosensors adjustable by the rods 37 and 38 may be set to monitor minimum and maximum desirable pipe wall thickness.

Figure 3:
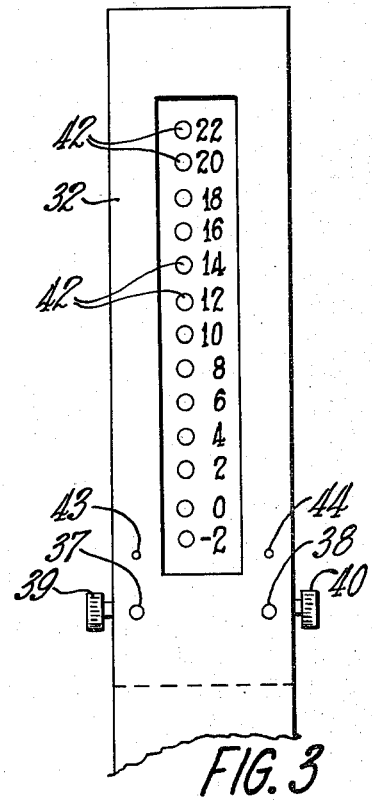
FIG. 3 is an enlarged elevational view of an indicating or display portion of the apparatus, taken in the direction of arrows 3—3 of FIG. 1.

Each of the photosensors is part of a separate electronic circuit with transistors (not shown), resistors (not shown), and a light emitting diode 42 (FIG. 3). The circuits for the minimum and maximum thickness photosensors also include relays that may stop the machine or be coupled to an alarm or to servomechanisms for automatically correcting the supply of raw materials for the pipe being formed.

The light source in the lowr box 33 and the photosensor array 36 in the upper box 34 are disposed equal distances respectively below and above the axis of the mandrel wall 10. As shown in FIG. 3, the light emitting diodes 42 of the circuits for the photosensors of the array 36 are arranged in a display at the front of the bar 32 to form a column that lights up from the bottom in accordance with the position of the edge of the shadow of the pipe on the photosensor array 36, the shadow being produced by the intrusion of the pipe into the rays of light emanating from the light source in the lower box 33. In the actual device, the twenty-six light emitting diodes 42 are numbered from minus two to plus 23 (−2, −1, 0, 1, . . . 23), but for ease of illustration, only the even-numbered diodes are shown. The photosensors of the array 36 are spaced two millimeters apart, but they are twice as far from the light source in the lower box 33 as the edge of the pipe at a horizontal plane through its axis. Therefore, in the actual device, the numbered diodes of the display measure differences of one millimeter in the pipe wall thickness.

The adjustability of the mounting plate 24 along the bar 18 provides a means for adjusting the source of light in the lower box 33 and the sensing and indicating means in the upper box 34 toward or away from the mandrel wall 10 to enable the reading on the sensing and indicating means, determined by the position of the shadow line of the mandrel wall 10 on the sensing and indicating means caused by the intrusion of the mandrel wall 10 into the rays of light emanating from the source of light, to be set at a zero point, corresponding to the diode 42 identified by the numeral "0", on the sensing and indicating means before the pipe forming materials are applied to the mandrel wall 10, whereby the wall thickness of a pipe formed on the mandrel may be indicated by the change, caused by the presence of the pipe forming materials, in the position of the shadow line from the zero point on the sensing and indicating means.

Thus, before the pipe forming materials are applied to the mandrel wall 10, the apparatus 4 is adjusted to a position such that the diodes labelled "−2" and "−1" are lighted and the diode labelled "0" is flickering. Light emitting diodes 43 and 44 are also provided respectively for the circuits of the photosensors adjustable by the rods 37 and 38. If desired, a separate circuit with a zener voltage stabilizer providing an analog signal may be connected to a recorder to provide monitoring of the pipe wall thickness at a location remote from the machine. A recorder 46 is shown in FIG. 1.

Figure 5:
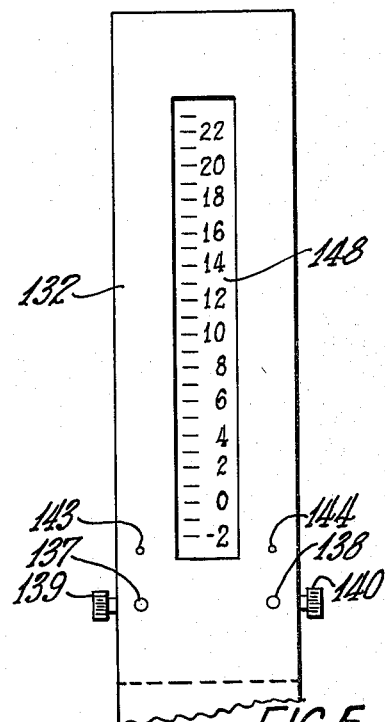
FIG. 5 is a view similar to FIG. 3, but showing the embodiment of FIG. 4.

An alternative embodiment of the invention is shown in FIGS. 4 and 5. In this embodiment, the column of light emitting diodes 42 of the embodiment of FIGS. 1–3 is replaced by a white plate or scale 148 angularly mounted within an upper box 134. A bar 132 has the box 134 mounted on its upper end portion. An outer wall 110 of a mandrel and a pipe 112 formed thereon are shown in broken lines. The plate 148 is angularly adjustable by means of an upper screw 150 and a lower screw 152 accessible from the rear of the box 134. The upper end portion of the plate 148 is pivotally connected to an internally threaded sleeve 154 mounted on the screw 150 and the lower end portion is suitably connected to a nut 156 mounted on the screw 152. The plate 148 is readable from the front of the bar 132 through a suitable aperture therein, the box 134 also having a corresponding aperture. The pipe wall thickness can be read directly from the position of the edge of the shadow of the pipe 112 on the plate 148. Linearly adjustable rods 137 and 138 fastenable in adjusted positions respectively by set screws 139 and 140 determine the positions of photosensors (not shown) for monitoring minimum and maximum desirable pipe wall thickness. Light emitting diodes 143 and 144 are provided respectively in the circuits of the photosensors adjustably positionable by the rods 137 and 138. Preferably an array of photosensors similar to the array 36 is provided in the embodiment of FIGS. 4 and 5 off to one side of the scale 148 to provide signals for a recorder similar to the recorder 46.

Various modifications may be made in the structure shown and described without departing from the spirit and scope of the invention.

I claim:

1. A wall thickness monitoring apparatus for use with a rotatable mandrel having a cylindrical surface for receiving liquid resin hardenable to form a tubular body, the apparatus comprising a source of light mounted adjacent the cylindrical surface of the mandrel substantially along a tangent to a cross section thereof and on one side of a reference plane perpendicular to the tangent and containing the axis of rotation of the mandrel, a sensing and indicating means mounted adjacent the cylindrical surface of the mandrel substantially along the tangent but on the opposite side of the reference plane, the source of light and the sensing and indicating means being disposed entirely on one side of a plane perpendicular to the reference plane and containing the axis of rotation of the mandrel, and means for adjusting the source of light and the sensing and indicating means in a direction parallel to the reference plane toward or away from the mandrel surface to enable the reading on the sensing and indicating means, determined by the position of the shadow line of the mandrel surface on the sensing and indicating means caused by the intrusion of the mandrel surface into the rays of light emanating from the source of light, to be set at a zero point on the sensing and indicating means before the tubular body is formed on the mandrel, whereby the wall thickness of a tubular body formed on the mandrel may be indicated by the change, caused by the presence of the tubular body, in the position of the shadow line from the zero point on the sensing and indicating means.

2. A wall thickness monitoring apparatus as claimed in claim 1 wherein the sensing and indicating means includes an array of photosensors uniformly spaced from each other in a direction perpendicular to the axis of the mandrel.

3. A wall thickness monitoring apparatus as claimed in claim 2 wherein the sensing and indicating means further includes a row of light emitting diodes which light up from one end of the row in accordance with the wall thickness of the tubular body.

4. A wall thickness monitoring apparatus as claimed in claim 2 including recording means for monitoring the wall thickness of the tubular body from a point remote from the mandrel.

5. A wall thickness monitoring apparatus as claimed in claim 2 further including a pair of adjustabaly mounted photosensors respectively positionable to monitor minimum and maximum desirable wall thickness.

6. A wall thickness monitoring apparatus as claimed in claim 1 wherein the sensing and indicating means includes a scale having tubular body wall thickness indicating marks thereon.

7. A wall thickness monitoring apparatus as claimed in claim 6 further including a pair of adjustably mounted photosensors respectively positionable to monitor minimum and maximum desirable wall thickness.

* * * * *